United States Patent
Binneberg et al.

(10) Patent No.: US 6,305,174 B1
(45) Date of Patent: Oct. 23, 2001

(54) SELF-TRIGGERING CRYOGENIC HEAT FLOW SWITCH

(75) Inventors: Armin Binneberg, Freital; Gunter Kaiser, Dresden, both of (DE)

(73) Assignee: Institut fuer Luft- und Kaeltetechnik Gemeinnuetzige Gesellschaft mbH, Dresden (DE)

( * ) Notice: Subject to any disclaimer, the term of this patent is extended or adjusted under 35 U.S.C. 154(b) by 0 days.

(21) Appl. No.: 09/509,848

(22) PCT Filed: Jul. 16, 1999

(86) PCT No.: PCT/DE99/02232

§ 371 Date: Apr. 3, 2000

§ 102(e) Date: Apr. 3, 2000

(87) PCT Pub. No.: WO00/08536

PCT Pub. Date: Feb. 17, 2000

(30) Foreign Application Priority Data

Aug. 5, 1998 (DE) .............................................. 198 35 305

(51) Int. Cl.$^7$ ...................................................... F25B 9/00
(52) U.S. Cl. .................................... 62/6; 62/51.1; 62/383
(58) Field of Search ................................. 62/6, 383, 51.1

(56) References Cited

U.S. PATENT DOCUMENTS

| 3,225,820 | 12/1965 | Riordan . |
| 3,306,075 | 2/1967 | Cowans . |
| 3,362,467 | 1/1968 | Kummerer . |
| 3,430,455 | 3/1969 | Stuart et al. . |
| 3,519,067 | 7/1970 | Schmidt . |
| 3,531,752 | 9/1970 | Gourley . |
| 3,807,188 | 4/1974 | Lagodmos . |
| 4,673,030 | 6/1987 | Basiulis . |
| 4,770,004 | 9/1988 | Lagodmos . |
| 4,771,823 | 9/1988 | Chan . |
| 5,379,601 | * 1/1995 | Gillett ..................................... 62/383 |
| 5,682,751 | * 11/1997 | Langhorn et al. ...................... 62/383 |
| 5,842,348 | * 12/1998 | Kaneko et al. ......................... 62/383 |

FOREIGN PATENT DOCUMENTS

| 2115771 | 10/1972 | (DE) . |
| 3017252 | 11/1981 | (DE) . |
| 4126227 | 2/1993 | (DE) . |
| 4224449 | 2/1994 | (DE) . |
| 4320505 | 12/1994 | (DE) . |
| 1518726 | 3/1968 | (FR) . |
| 56-65216 | 6/1981 | (JP) . |

* cited by examiner

Primary Examiner—Ronald Capossela
(74) Attorney, Agent, or Firm—W. F. Fasse; W. G. Fasse

(57) ABSTRACT

Self-triggering cryogenic heat flow switches are used particularly with cooling systems that require a redundant operation. The self-triggering cryogenic heat flow switch has the simplest possible construction while providing a reliable, maintenance-free mode of operation, and ensures a self-switching connection between a heat sink and an end use device or application that is to be cooled. The heat flow switch includes an outer hollow cylinder 1 that is connected with a heat sink 9, and an inner body 2 that is arranged coaxially to the outer hollow cylinder 1 and connected to the end use device or application to be cooled. When the heat sink 9 is switched off, a concentric annular gap 4 fixed by spacers is provided between the hollow cylinder 1 and the inner body 2. The linear thermal expansion coefficient of the outer cylinder 1 is greater than that of the inner body 2, so that the outer cylinder 1 contracts into thermally conducting contact with the inner body 2 when the heat sink 9 is switched on to provide cooling.

20 Claims, 3 Drawing Sheets

SELF-TRIGGERING CRYOGENIC HEAT FLOW SWITCH

FIELD OF THE INVENTION

The invention relates to self-triggering cryogenic heat flow or heat flux switches that are used particularly with cooling systems that require a redundant operation.

BACKGROUND INFORMATION

In satellite communications technology, maintenance-free refrigerator-cooled electronic systems (antennas, high temperature superconducting filters, amplifiers) are already being used and will be used increasingly in the future. Such systems must be constructed to provide a service life of several years. The refrigerators are subject to wear in operation and, therefore, in order to avoid a system failure, at least one other refrigerator must be provided as a redundancy. During operation, this redundant refrigerator must be thermally isolated from the end use device or application, since it otherwise acts as a parasitic heat bridge, and must be thermally coupled with the application when the primary cooling refrigerator fails. At the same time, the defective primary refrigerator must be thermally isolated from the end use device or application. The switch-over to the redundant refrigerator must occur as quickly as possible so that the end use device or application does not heat up excessively in the meantime and possibly have to be temporarily taken out of operation. For this reason it is advantageous to cool down the redundant cooler or refrigerator in a no-load condition and only then connect it to the end use device or application as soon as its cold head temperature is lower than the temperature of the application.

In order to solve this problem, various conventional devices have been used, such as active electromechanically or pneumatically operated heat switches, self-triggering uni-directional cryogenic heat exchanger tubes or heat pipes (U.S. Pat. No. 4,673,030), or gas gap heat flow switches that are pumped by cryosorption (U.S. Pat. No. 4,771,823).

The active mechanical systems have provided the best solution functionally to date. They are, however costly to manufacture, require additional control electronics, and themselves carry a significant risk of failure.

Uni-directional cryogenic heat pipes are still the subject of intensive development. They are very costly to manufacture, as either high pressure engineering or cryo-engineering is required to fill them with the working medium. At ambient temperature they are subject to a high internal pressure, which requires great tube wall thicknesses. Consequently, these heat pipes have a poor switching ratio and are still perceptible as parasitic heat bridges even after isolation or separation of the heat contact.

In contrast, it is substantially less costly to manufacture gas gap heat flow switches that are pumped by cryosorption. These switches are also self-actuating without an additional control. In order to switch over to the redundant refrigerator, however, the application and the failed refrigerator must be heated to the extent that the cryosorption pump desorbs sufficient gas to close the heat flow switch of the redundant refrigerator. A high-temperature superconducting application would have to be taken out of operation to do this.

SUMMARY OF THE INVENTION

It is an object of the invention to provide a self-triggering cryogenic heat flow switch that has the simplest possible construction while providing a reliable maintenance-free mode of operation, and ensuring thereby a self-switching connection between a heat sink and an end use device or application to be cooled.

The above object of the invention has been achieved in a cryogenic cooling arrangement including a selectively actuatable heat sink, an end use application which is to be cooled, and a cryogenic heat flow switch selectively coupling the end use application with the heat sink for heat transfer therebetween. According to the invention, the heat flow switch is a self-triggering cryogenic heat flow switch comprising an outer hollow cylinder that has an inner perimeter surface and that is connected to the heat sink, an inner body that has an outer perimeter surface arranged coaxially relative to and at least partly within the inner perimeter surface of the outer hollow cylinder and that is connected to the end use application which is to be cooled, and a plurality of spacers arranged radially between the outer perimeter surface of the inner body and the inner perimeter surface of the outer hollow cylinder. The outer hollow cylinder has a linear thermal expansion coefficient greater than that of the inner body. A concentric annular gap is formed between the outer perimeter surface of the inner body and the inner perimeter surface of the outer hollow cylinder and is maintained by the spacers when the heat sink is not actuated. This concentric annular gap is closed and the inner perimeter surface of the outer hollow cylinder comes into contact with the outer perimeter surface of the inner body when the heat sink is actuated.

The heat flow switch according to the invention functions according to the principle of thermal expansion. With reference to the starting temperature T. and the linear dimensions at this starting temperature, the heat flow switch has a switch-on point Te and a switch-off point Ta. These points are defined by the following relationships:

$$D\left(1 + \int_{To}^{Te} \alpha_D(T) dT\right) - d = 0$$

$$D\left(1 + \int_{To}^{Ta} \alpha_D(T) dT\right) - d\left(1 + \int_{To}^{Ta} \alpha_d(T) dT\right) = 0$$

The heat sink is connected to the outer hollow cylinder of the heat flow switch. The device or application to be cooled is connected to the inner solid or hollow cylinder of the heat flow switch. While cooling, the outer hollow cylinder contracts until, at the switch-on point, its inner diameter reaches the outer diameter of the still warm inner solid or hollow cylinder. A heat transfer is established, whereby the inner solid or hollow cylinder and the outer hollow cylinder continue to cool together to a temperature below the switch-off point. The compressive strain between the two parts provides a reliable heat contact with low heat transfer resistance.

The heat contact opens when the outer hollow cylinder heats up above the switch-off point. The device or application to be cooled is thermally decoupled from the heat sink as the heat sink continues to heat up.

These heat flow switches can be constructed with great precision with the aid of the above mentioned relationships once the temperature dependency of the linear thermal expansion coefficients of the materials selected for use have been dilatometrically ascertained. If the diameters D and d are freely selectable, the switch-on point and the switch-off point of the heat flow switch can be freely selected in broad ranges. If one of the diameters is predefined, then either the switch-on point or the switch-off point can be freely selected.

BRIEF DESCRIPTION OF THE DRAWINGS

The invention will be explained in greater detail, based on the following example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
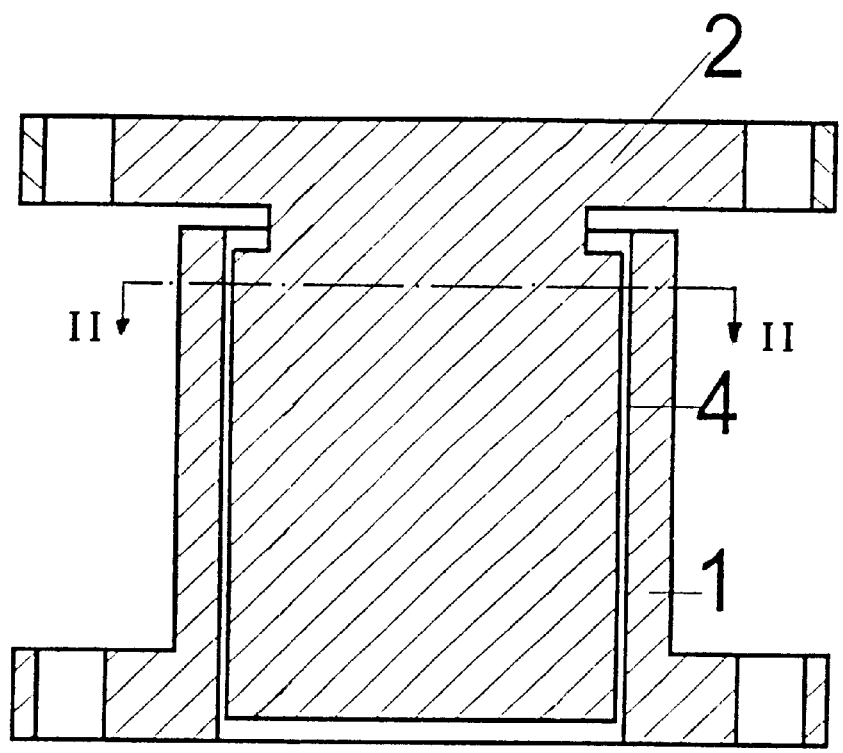
FIG. 1 is a lengthwise sectional view showing a heat flow switch of a first embodiment according to the invention.
Figure 2:
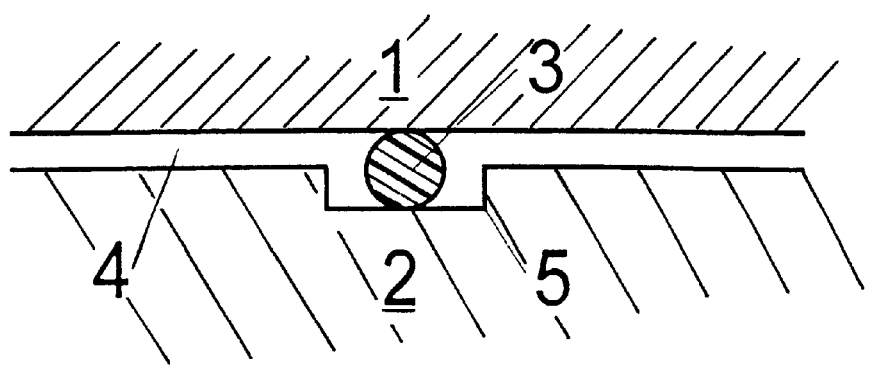
FIG. 2 is an enlarged schematic cross-sectional view showing a detail portion along a section plane II—II in FIG. 1.
Figure 1A:
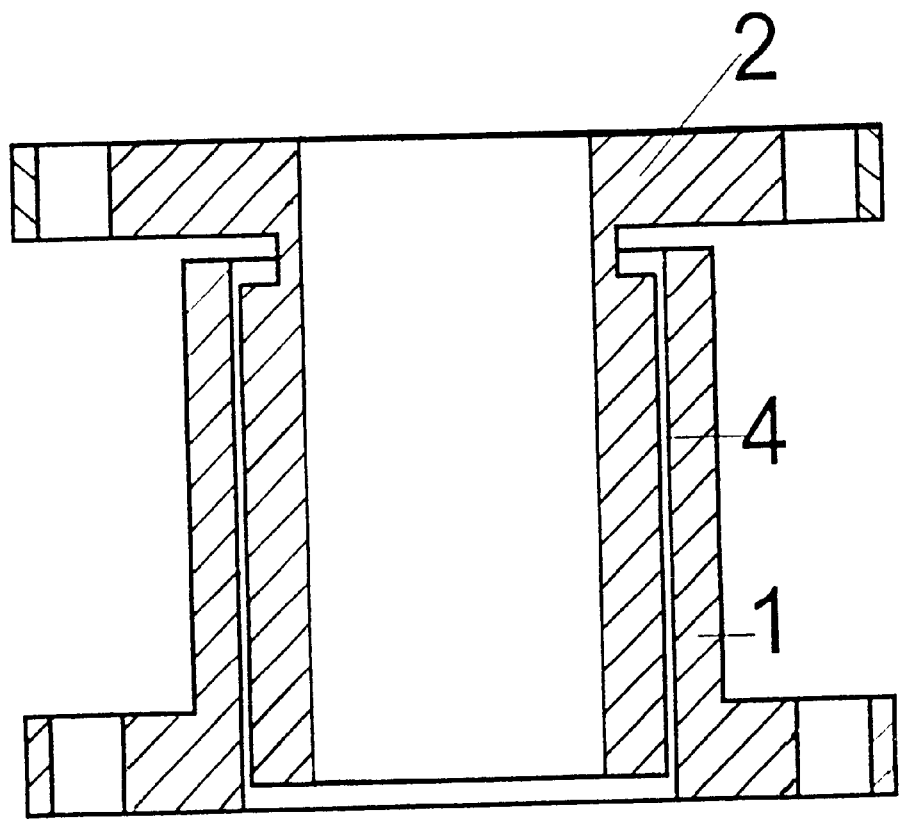
FIG. 1A is a lengthwise sectional view showing a heat flow switch of a second embodiment according to the invention.

The heat flow switch according to the invention comprises an outer hollow cylinder 1 and an inner body 2. In FIG. 1, the inner body 2 is a solid body, while FIG. 1A shows an alternative embodiment in which the inner body 2 is a hollow cylinder. As shown in FIG. 2, spacers 3 ensure an even annular gap 4 between the inner body 2 and the outer cylinder 1. For practical considerations, at least three spacers 3 are evenly distributed about the circumference of the inner body 2 in longitudinal grooves 5. The spacers 3 consist of an elastic material such as, for example, nylon or Teflon.

The hollow cylinder 1 is advantageously made of copper and thus possesses a linear thermal expansion coefficient $\alpha_D = 17$ ppm/K and a thermal conductivity $\lambda = 401$ W/(m*K). The inner body 2 consists of molybdenum with an expansion coefficient of $\alpha_d = 5.1$ ppm/K and a thermal conductivity $\lambda = 138$ W/(m*K). These values are referenced to the ambient temperature.

Figure 3:
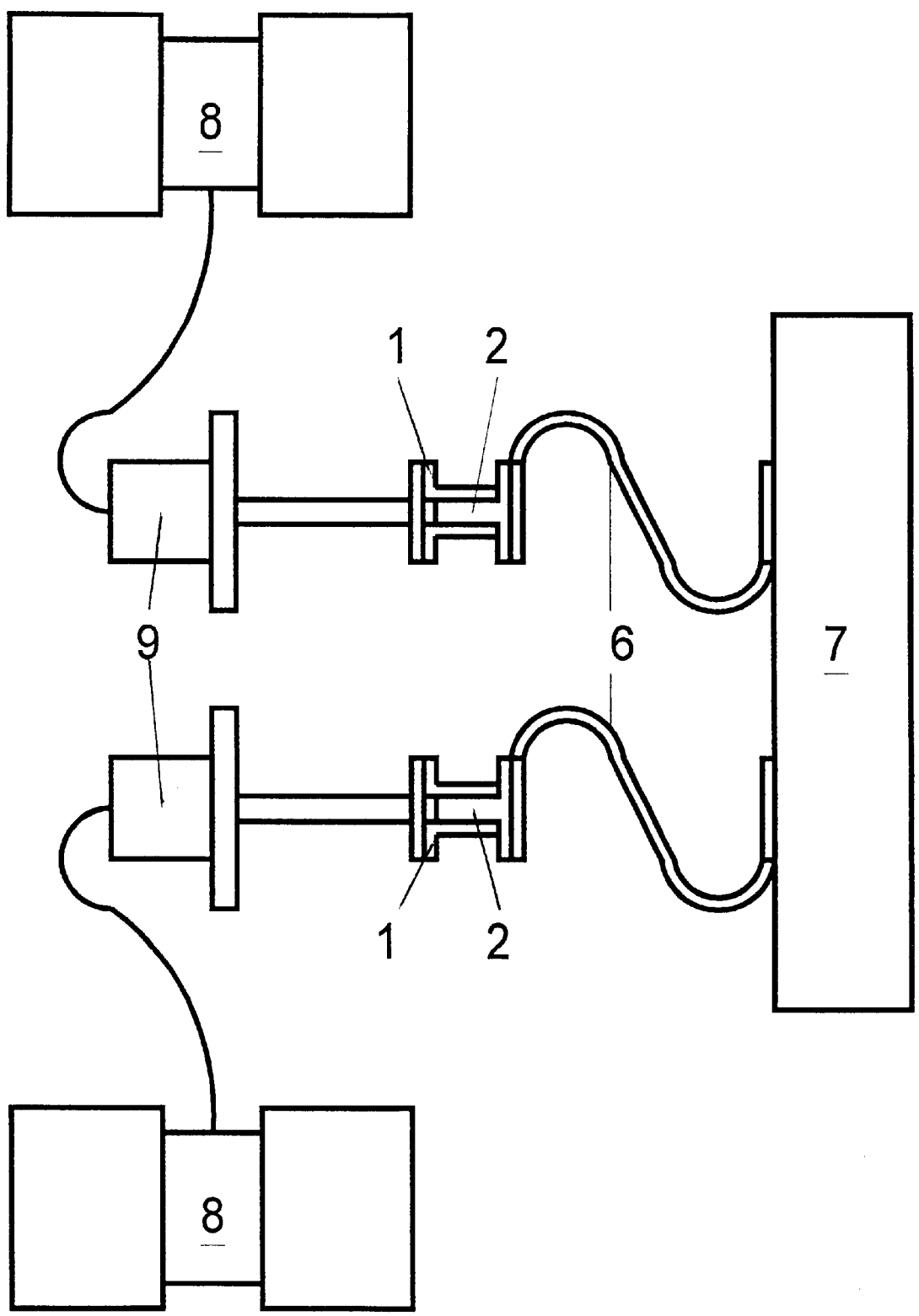
FIG. 3 schematically shows an application of the heat flow switches with two refrigerators.

FIG. 3 shows two refrigerators 9 with their dreves 8, whereby one refrigerator 9 is switched to be redundant. The inner bodies 2 of the heat flow switched are connected by respective flexible thermal interfaces 6 to the device or application 7 to be cooled. The hollow cylinders 1 are thermally conductingly coupled to the refrigherators 9.

The essential functional components of the heat flow switch can be produced by a precision mechanics manufacturer so as to provide very good reproducibility of their characteristics.

What is claimed is:

1. In a cryogenic cooling arrangement including a selectively actuatable heat sink, an end use application which is to be cooled, and a cryogenic heat flow switch selectively coupling said end use application with said heat sink for heat transfer therebetween, an improvement wherein said switch is a self-triggering cryogenic heat flow switch comprising an outer hollow cylinder that has an inner perimeter surface and that is connected to said heat sink, an inner body that has an outer perimeter surface arranged coaxially relative to and at least partly within said inner perimeter surface of said outer hollow cylinder and that is connected to said end use application which is to be cooled, and a plurality of spacers arranged radially between said outer perimeter surface of said inner body and said inner perimeter surface of said outer hollow cylinder, wherein said outer hollow cylinder has a first linear thermal expansion coefficient, and said inner body has a second linear thermal expansion coefficient that is less than said first linear thermal expansion coefficient, and wherein a concentric annular gap is formed between said outer perimeter surface of said inner body and said inner perimeter surface of said outer hollow cylinder and is maintained by said spacers when said heat sink is not actuated, and said concentric annular gap is closed and said inner perimeter surface of said outer hollow cylinder comes into contact with said outer perimeter surface of said inner body when said heat sink is actuated.

2. The improvement in the cryogenic cooling arrangement according to claim 1, wherein said inner peripheral surface of said outer hollow cylinder has a temperature dependent inner diameter identified as D, said outer peripheral surface of said inner body has a temperature dependent outer diameter identified as d, said first linear thermal expansion coefficient of said outer hollow cylinder is identified as $\alpha_D$, said second linear thermal expansion coefficient of said inner body is identified as $a_d$, said concentric annular gap is formed upon heating to and above a switch-off temperature identified as Ta, and said concentric annular gap is closed and said inner perimeter surface of said outer hollow cylinder contacts said outer perimeter surface of said inner body upon cooling to and below a switch-on temperature identified as Te, and wherein, with reference to a starting temperature identified as To, both of the following equations hold true:

$$D\left(1 + \int_{To}^{Te} \alpha_D(T) dT\right) - d = 0 \text{ and}$$

$$D\left(1 + \int_{To}^{Ta} \alpha_D(T) dT\right) - d\left(1 + \int_{To}^{Ta} \alpha_d(T) dT\right) = 0.$$

3. The improvement in the cryogenic cooling arrangement according to claim 1, wherein said spacers are respectively filaments of a synthetic elastic material.

4. The improvement in the cryogenic cooling arrangement according to claim 1, wherein said spacers are respectively filaments of nylon or Teflon.

5. The improvement in the cryogenic cooling arrangement according to claim 1, wherein a plurality of longitudinally extending grooves are provided in and uniformly distributed about a circumference of said outer perimeter surface or said inner perimeter surface, and said spacers are respectively received in said grooves.

6. The improvement in the cryogenic cooling arrangement according to claim 1, wherein said outer hollow cylinder comprises copper and said inner body comprises molybdenum.

7. The improvement in the cryogenic cooling arrangement according to claim 1, wherein said outer hollow cylinder consists of copper and said inner body consists of molybdenum.

8. The improvement in the cryogenic cooling arrangement according to claim 1, wherein said inner body is a hollow cylindrical body.

9. The improvement in the cryogenic cooling arrangement according to claim 1, wherein said inner body is a solid cylindrical body.

10. The improvement in the cryogenic cooling arrangement according to claim 1, further comprising thermally conducting members that respectively connect said outer hollow cylinder to said heat sink and connect said inner body to said end use application.

11. A self-triggering cryogenic heat flow switch comprising an outer hollow cylinder that has an inner perimeter surface, an inner body that has an outer perimeter surface arranged coaxially relative to and at least partly within said inner perimeter surface of said outer hollow cylinder, and a plurality of spacers arranged radially between said outer perimeter surface of said inner body and said inner perimeter surface of said outer hollow cylinder, wherein said outer hollow cylinder has a first linear thermal expansion coefficient, and said inner body has a second linear thermal expansion coefficient that is less than said first linear thermal expansion coefficient, and wherein a concentric annular gap is formed between said outer perimeter surface of said inner body and said inner perimeter surface of said outer hollow cylinder and is maintained by said spacers when said outer hollow cylinder is at or above a switch-off temperature at which said outer hollow cylinder differentially thermally expands away from said inner body, and said concentric annular gap is closed and said inner perimeter surface of said outer hollow cylinder comes into contact with said outer perimeter surface of said inner body when said outer hollow cylinder is at or below a switch-on temperature at which said outer hollow cylinder differentially thermally contracts into contact with said inner body.

12. The self-triggering cryogenic heat flow switch according to claim 11, wherein said inner peripheral surface of said outer hollow cylinder has a temperature dependent inner diameter identified as D, said outer peripheral surface of said inner body has a temperature dependent outer diameter identified as d, said first linear thermal expansion coefficient of said outer hollow cylinder is identified as $\alpha_D$, said second linear thermal expansion coefficient of said inner body is identified as $\alpha_d$, said concentric annular gap is formed upon heating to and above a switch-off temperature identified as Ta, and said concentric annular gap is closed and said inner perimeter surface of said outer hollow cylinder contacts said outer perimeter surface of said inner body upon cooling to and below a switch-on temperature identified as Te, and wherein, with reference to a starting temperature identified as To, both of the following equations hold true:

$$D\left(1 + \int_{To}^{Te} \alpha_D(T)dT\right) - d = 0 \quad \text{and}$$

$$D\left(1 + \int_{To}^{Ta} \alpha_D(T)dT\right) - d\left(1 + \int_{To}^{Ta} \alpha_d(T)dT\right) = 0.$$

13. The self-triggering cryogenic heat flow switch according to claim 1, wherein said spacers are respectively filaments of a synthetic elastic material.

14. The self-triggering cryogenic heat flow switch according to claim 1, wherein said spacers are respectively filaments of nylon or Teflon.

15. The self-triggering cryogenic heat flow switch according to claim 1, wherein a plurality of longitudinally extending grooves are provided in and uniformly distributed about a circumference of said outer perimeter surface or said inner perimeter surface, and said spacers are respectively received in said grooves.

16. The self-triggering cryogenic heat flow switch according to claim 1, wherein said outer hollow cylinder comprises copper and said inner body comprises molybdenum.

17. The self-triggering cryogenic heat flow switch according to claim 1, wherein said outer hollow cylinder consists of copper and said inner body consists of molybdenum.

18. The self-triggering cryogenic heat flow switch according to claim 1, wherein said inner body is a hollow cylindrical body.

19. The self-triggering cryogenic heat flow switch according to claim 1, wherein said inner body is a solid cylindrical body.

20. The self-triggering cryogenic heat flow switch according to claim 1, further comprising thermally conducting members respectively connected to said outer hollow cylinder and to said inner body.

\* \* \* \* \*

UNITED STATES PATENT AND TRADEMARK OFFICE
CERTIFICATE OF CORRECTION

PATENT NO. : 6,305,174 B1
DATED : October 23, 2001
INVENTOR(S) : Binneberg et al.

It is certified that error appears in the above-identified patent and that said Letters Patent is hereby corrected as shown below:

Column 2,
Line 31, after "temperature", replace "T." by -- $T_o$ --;

Column 3,
Line 30, after "Teflon", add --(TM)--;
Line 38, after "their", replace "dreves" by -- drives --;

Column 6,
Lines 16, 19, 22, 28, 31, 34, 37 and 40, after "claim", replace "1" by -- 11 --;

Signed and Sealed this

Twenty-third Day of July, 2002

Attest:

JAMES E. ROGAN
Attesting Officer
*Director of the United States Patent and Trademark Office*